(12) United States Patent
Vaz Coelho et al.

(10) Patent No.: US 8,905,448 B2
(45) Date of Patent: Dec. 9, 2014

(54) SIZE-ADJUSTABLE, PIVOTABLE TRIPLE CONNECTION DEVICE

(75) Inventors: João Luiz Vaz Coelho, Belford Roxo (BR); Jorge Artur Medeiros Romeu, Copacabana (BR)

(73) Assignee: Subsea 7 do Brasil Servicos LTDA, Niteroi (BR)

( * ) Notice: Subject to any disclaimer, the term of this patent is extended or adjusted under 35 U.S.C. 154(b) by 0 days.

(21) Appl. No.: 14/112,902

(22) PCT Filed: Apr. 19, 2012

(86) PCT No.: PCT/BR2012/000109
§ 371 (c)(1),
(2), (4) Date: Jan. 7, 2014

(87) PCT Pub. No.: WO2012/142686
PCT Pub. Date: Oct. 26, 2012

(65) Prior Publication Data
US 2014/0125074 A1     May 8, 2014

(30) Foreign Application Priority Data

Apr. 19, 2011   (BR) .................................. 1101479

(51) Int. Cl.
*B66C 1/22*     (2006.01)
*B66C 1/66*     (2006.01)

(52) U.S. Cl.
CPC ........................................ *B66C 1/66* (2013.01)
USPC ........................................ 294/82.11; 294/74

(58) Field of Classification Search
USPC ............ 294/74, 82.1, 82.11, 82.12, 215, 169; 403/54; 414/137.5, 142.8; 59/86, 88, 59/93

See application file for complete search history.

(56) References Cited

U.S. PATENT DOCUMENTS

| | | | |
|---|---|---|---|
| 1,507,960 A * | 9/1924 | Heinzinger | 403/169 |
| 1,567,719 A | 12/1925 | Erlandsen | |
| 2,139,294 A | 12/1938 | Weigant | |
| 2,346,277 A * | 4/1944 | Sherman | 294/82.1 |
| 2,371,009 A * | 3/1945 | Wirkkala | 294/82.11 |
| 2,842,822 A * | 7/1958 | Bennett | 24/370 |
| 2,909,386 A * | 10/1959 | Ramey | 294/82.1 |
| 3,170,723 A * | 2/1965 | Knapp et al. | 294/67.4 |
| 4,068,467 A | 1/1978 | Schreyer et al. | |
| 4,264,097 A * | 4/1981 | Rehbein | 294/82.11 |
| 4,371,202 A * | 2/1983 | Freeman et al. | 403/79 |
| 4,429,526 A * | 2/1984 | Rehbein | 59/93 |
| 4,763,943 A * | 8/1988 | Melvin | 294/82.13 |
| 6,719,341 B2 * | 4/2004 | Gotz et al. | 294/82.11 |

FOREIGN PATENT DOCUMENTS

| | | |
|---|---|---|
| DE | 297 09 868 | 8/1997 |
| FR | 2 604 142 | 3/1988 |

* cited by examiner

*Primary Examiner* — Dean Kramer
(74) *Attorney, Agent, or Firm* — Levy & Grandinetti (57) ABSTRACT

A size-adjustable, pivotable triple-connection device is disclosed. The device has a first element with an upper hole and a lower hole and a second element with an upper hole and a lower hole. The second element is pivotable in relation to an axis of alignment of upper holes of the first and second elements, and aligning, when not connected by its lower hole, in relation to a vertical axis of the first element. The device also has a shackle with a pin that traverses the axis defined by the alignment of the upper holes of the first and second elements.

12 Claims, 8 Drawing Sheets

PRIOR ART

SIZE-ADJUSTABLE, PIVOTABLE TRIPLE CONNECTION DEVICE

This Application is the U.S. National Phase of International Application Number PCT/BR2012/000109 filed on Apr. 19, 2012, which claims priority to Brazilian Patent Application Number PI1101479-2 filed on Apr. 19, 2011.

TECHNICAL FIELD

The present invention relates to cargo transfer operations between two cargo handling systems. In particular, the present invention relates to a pivotable triple-connection device that permits the connection of ends of two cargo-handling systems and connection of the cargo to be transported, whose size is adjustable in relation to the connections performed.

DESCRIPTION OF THE STATE-OF-THE-ART

Various cargo transfer maneuvers make use of two independent cargo handling systems. One of these maneuvers, known in practice as "pull in", performs the transfer of a pipe between a ship and a stationary production unit, such as a platform. In this type of maneuver, it is necessary to per-form the connection of three ends, namely the end of the pipe, the end (cabie, for example) of the ship's cargo-handling system and the end (also a cable, for example) of the platform's cargo-handling system. The cargo-handling system can be a tower crane, auto crane or any other related equipment.

Figures 1, 2:
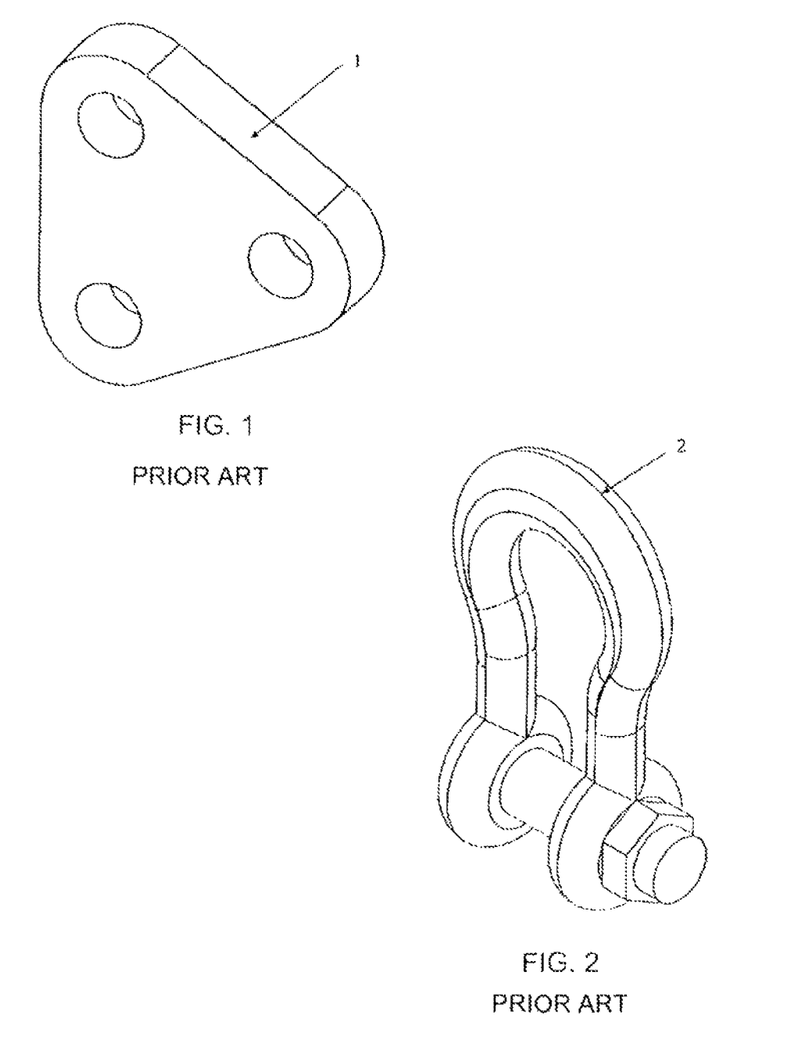
FIG. 1 illustrates the triplate device known in prior art.
FIG. 2 illustrates a shackle common in prior art.

A device known in prior art capable of performing this triple connection is the so-called triplate (FIG. 1). The triplate is typically a triangle-shaped device equipped with three holes. Each of these holes receives one of the aforementioned ends, which are generally attached to the same by shackles (FIG. 2).

Figure 3:
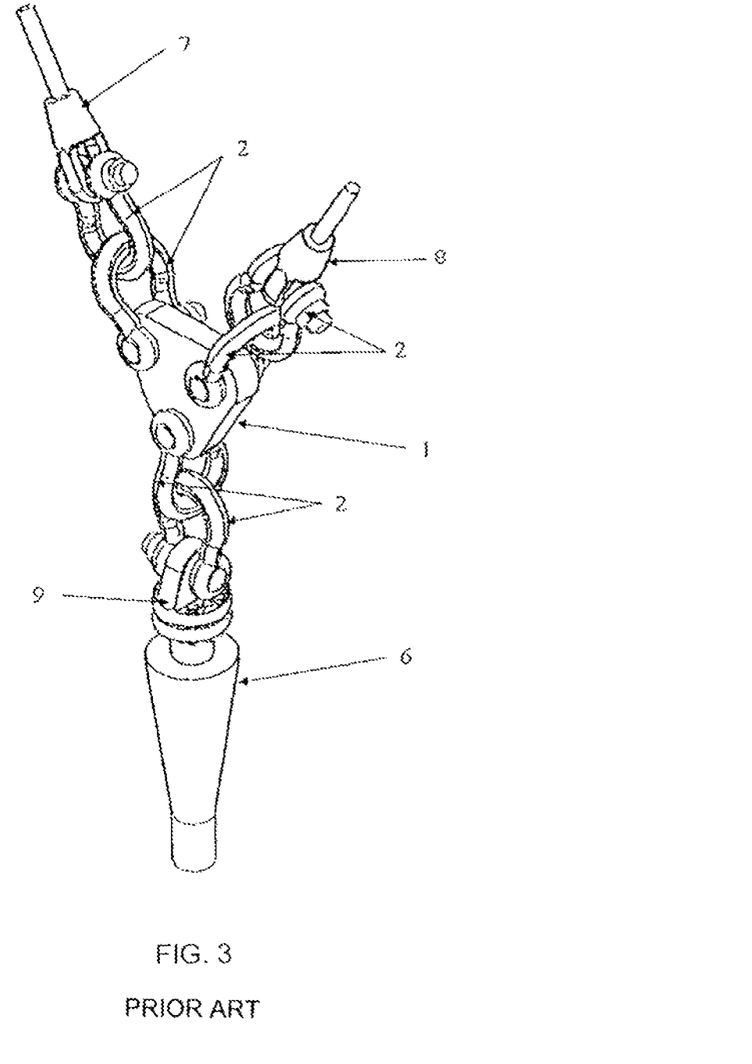
FIG. 3 illustrates all the connections performed using a triplate.

In the process of transfer and installation of a pipe on a platform, the ship issues a messenger cable (not drawn) aboard the platform. The end of the platform's cargo-handling system is then connected to the messenger cable and returned to the ship. With the cable of the platform's cargo-handling system aboard the ship, the assembly of the triplate is performed, joining the cables of the ship's and the platform's respective cargo-handling systems, and the end of the pipe to be transferred. FIG. 3 illustrates this configuration, where the triplate 1 is connected to the cable of the platform cargo-handling system 7, the cable of the ship's cargo-handling 8 and the end 9 of the pipe 6, all by way of shackles. After the connection of all the ends to the triplate, the transfer operation is performed.

Figure 4:
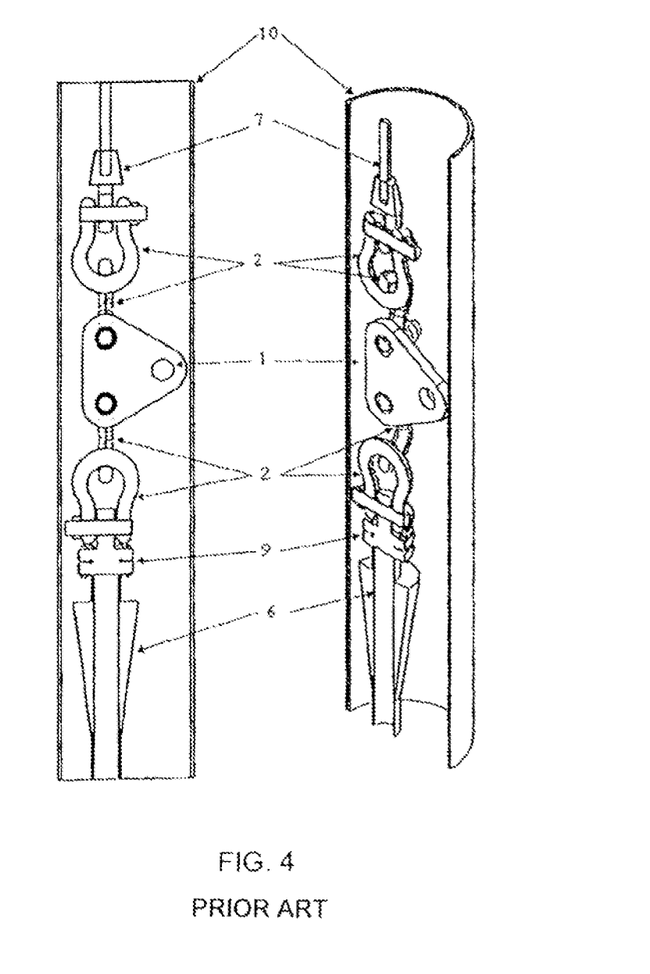
FIG. 4 illustrates the passage of a cargo transfer load through a platform I-tube using a triplate.

In some situations, the pipe to be transferred must pass through a tube on the platform. It is through this tube, known in practice as an I-tube, that the platform receives all arriving pipes. In such cases, the cable of the platform cargo-handling system 7 first passes inside this tube before being transferred to the vessel. During the transfer operation, and as the pipe is aligned with the I-tube, the cable of the ship's cargo-handling system 8 is disconnected from the triplate for passage of the whole through the I-tube. FIG. 4 illustrates the interior of the I-tube 10 through which the load, now disconnected from the cable 8, passes.

The above example demonstrates that, in any cargo transfer operation between two cargo-handling systems, where there will be passage through structures of reduced dimensions, the large size of the triplate is a serious problem. In the example above, it is not rare to have a situation where the triplate becomes lodged inside the I-tube 10, generating excessive load on the platform cargo-handling system and possible damage to the I-tube, as well as the interruption of the operation.

There is therefore need for a smaller and more efficient device efficient for use in this type of operation.

OBJECTIVES OF THE PRESENT INVENTION

The objective of the present invention is to solve the technical problem identified above.

Therefore, the objective of the present invention is to provide a device enabling the realization of a triple connection whose size is adjustable according to the number of connections made.

SUMMARY OF INVENTION

In order to achieve the objectives above, the device of the present invention comprises essentially two pivoting elements capable of alignment in relation to the same axis, and equipped with holes for establishment of connections. Through this configuration, one of the elements is simply pivoted when a triple connection is performed, returning to its initial position so that its respective connection is disconnected. Thus, in contrast to the triplate, which is a solid piece, the device of the present invention has a smaller dimension via the disconnection of one of its connections.

DESCRIPTION OF DRAWINGS

The above and other additional advantages, as well as the constitution of the device of the present invention will become clearer to those skilled in the art from the following description and accompanying drawings, of which.

DETAILED DESCRIPTION OF INVENTION

The following description is based on a preferred embodiment of the invention. As will be clear to anyone skilled in the art, however, the invention is not limited to this particular embodiment. Furthermore, despite the contextualization of the invention being made on the transfer of pipes in the offshore environment, it should be understood that its application is suited to any type of cargo transfer operation, regardless of location or the cargo to be transferred.

Figure 5:
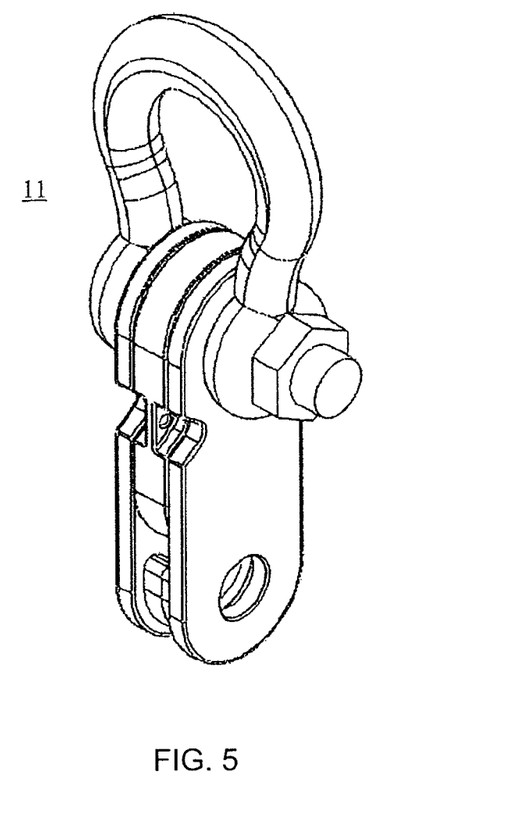
FIG. 5 illustrates the triple-connection device according to a preferred embodiment of the present invention.
Figure 6:
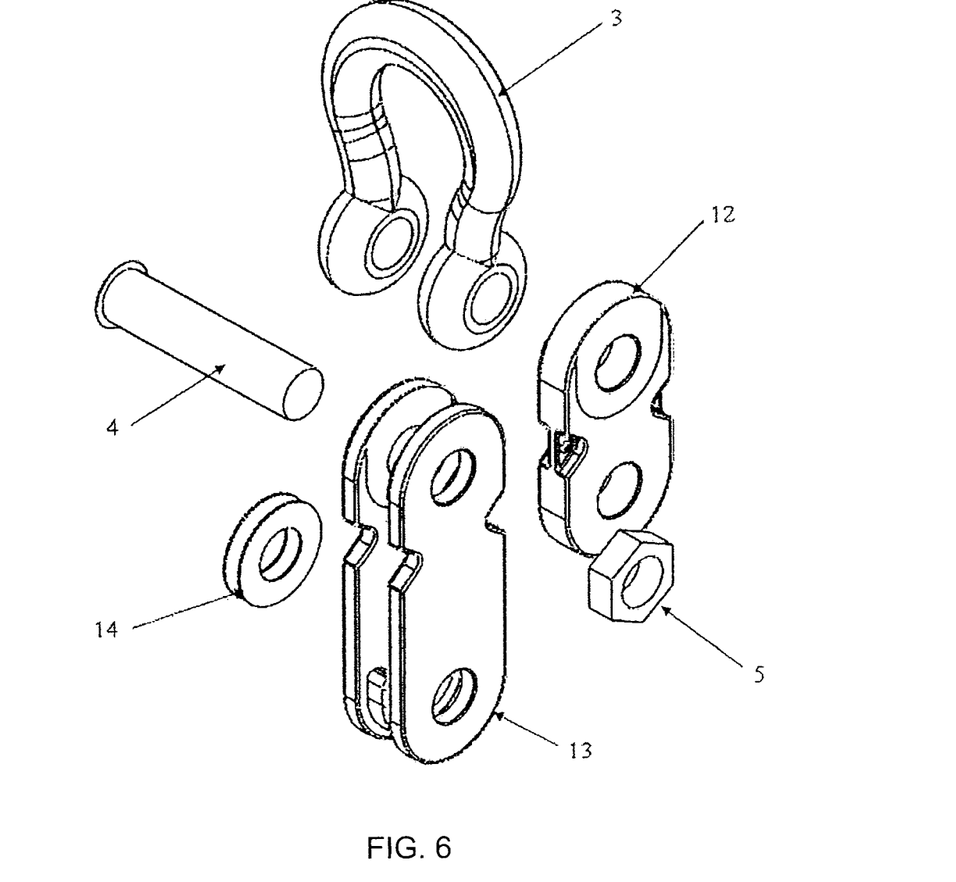
FIG. 6 shows an exploded view of the preferred embodiment of FIG. 5.

As can be seen in FIGS. 5 and 6, the triple-connection device 11 of the present invention in its preferred embodiment comprises two elements 12 and 13, composed of plates, both equipped with two holes. Bushings placed within holes of elements 12 and 13 can be optionally provided with the aim of facilitating the pivoting of these elements. In this embodiment, the outer element 13 is hollow for the reception of the shorter inner element 12. Both elements are pivotable around the pin 4 of a shackle 3, which is inserted in the bottom openings of the shackle 3 and in the upper holes of both elements 12 and 13. After insertion of the pin 4, the whole is secured together by a nut 5. Spacers 14, set out between the contact walls of elements 12 and 13 may optionally be incorporated with the intent of facilitating the pivoting thereof.

Although the above embodiment features the presence of a shackle at the junction of elements 12 and 13 and in the creation of a pivot point for the same, elements 12 and 13 can, alternatively, be initially fixed in place by a hollow shaft that traverses the upper holes of both. In this case, the shackle or any other equivalent connection element, would traverse the interior of the hollow shaft. Likewise, the point of pivotal fixation of element 12 in element 13 can be in a position other than the upper hole of element 13. Element 12 may, for example, be attached to element 13 on an axis positioned on the intermediary part of the latter. In this case, the presence of only holes would be required in element 13, with element 12 comprising a single hole.

Also by way of an alternative, elements 12 and 13 could have an adjacent configuration where, instead of an element receiving the other in its interior, both would be adjacent pivoting elements. This configuration, in particular, eliminates any restriction on size of the elements 12 and 13 and allows elements 12 and 13 to be solid elements.

Figure 7A:
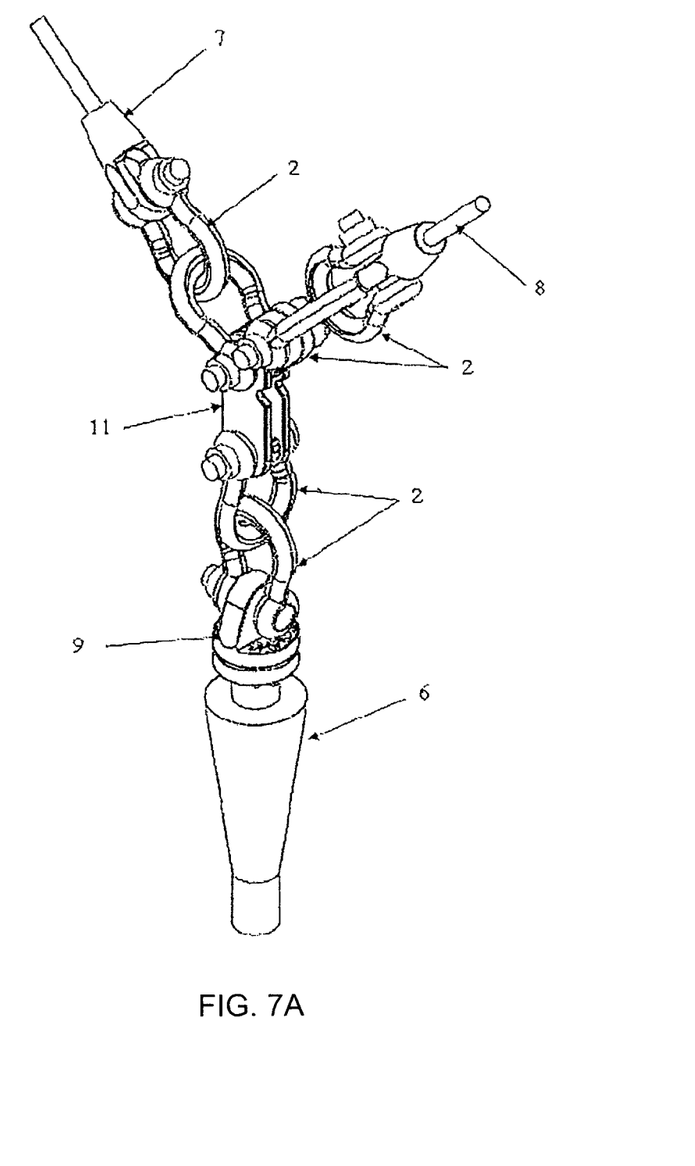
FIG. 7A illustrates the assembly of cargo transfer load using the triple-connection device of the present invention, in its preferred embodiment.
Figure 7B:
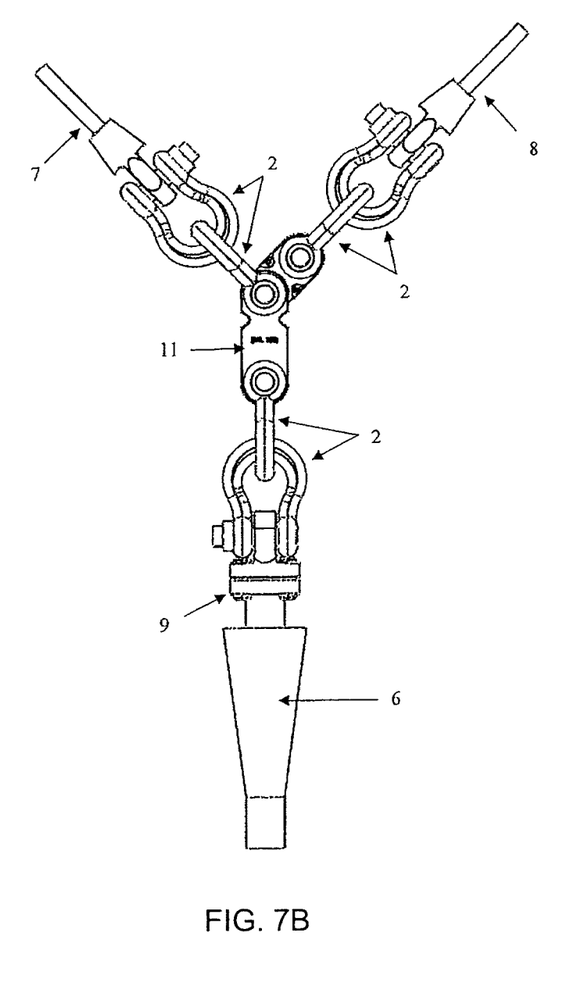
FIG. 7B shows the front view of the assembly of FIG. 7A.
Figure 8:
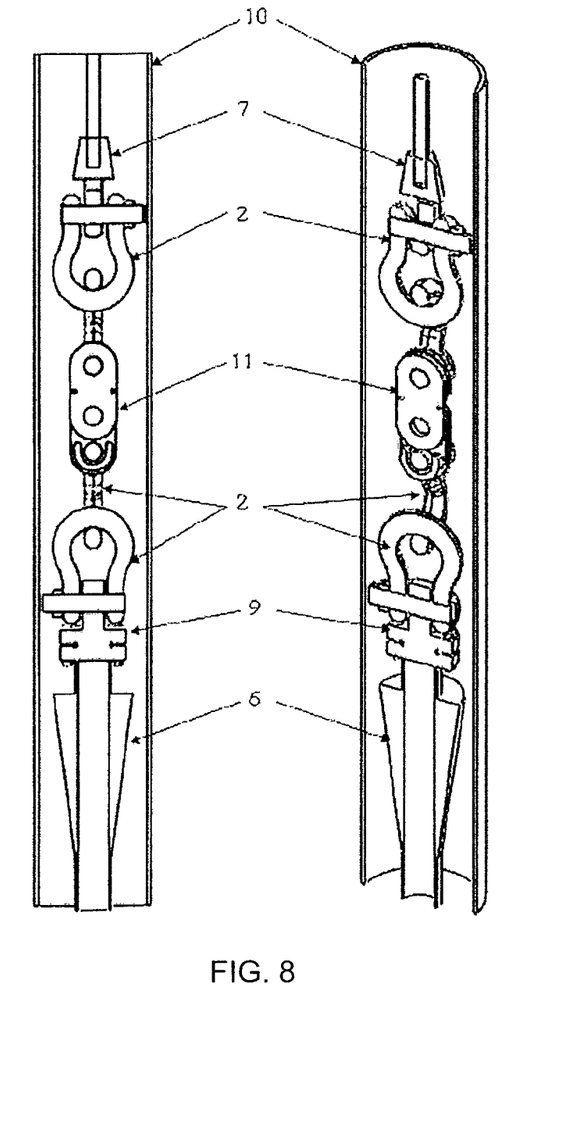
FIG. 8 illustrates the passage of a cargo transfer load using the triple-connection device of the present invention in its preferred embodiment.

The use of the pivotable triple-connection device 11 of the present invention does not in any way alter the performance of the cargo transfer operation. It presents a substitute for the triplate. The connection of the device of the present invention is done in the same manner as can be seen in FIGS. 7A and 7B. The cable of the platform cargo-handling system 7 is connected to the shackle that traverses the upper holes of elements 12 and 13. The cable of the ship's cargo-handling system 8 is connected, also by means of a shackle, to the lower hole of element 12. Finally, the end 9 of the pipe 6 to be transported is connected by a shackle to the lower hole of element 13. The great advantage of the device of the present invention is presented during the cargo transfer operation, at the point where the use of the ship's cargo handling system is no longer necessary. With the disconnection of the cable 8, element 12 will be aligned at the same vertical axis as element 13 by the simple action of gravity, which reduces the size of the device 11. In situations of passage through an I-tube, for example, the size of the pivotable triple-connection device ceases to be a problem, as can be seen in FIG. 8. Despite the action of gravity aligning the two elements 12 and 13 in relation to the same axis, a spring can also be provided between the two elements so as to ensure that element 12 returns to its initial position.

All the above description was based on the premise of the use of shackles on the connections. These are used in practice for safety reasons. However, nothing would prevent the direct connection of the ends of the cargo-handling systems and the cargo to be transported into the holes of the triple-connection device, as necessary.

The invention claimed is:

1. A size-adjustable, pivotable triple-connection device comprising:
   a first element comprising an upper hole and a lower hole;
   a second element comprising an upper hole and a lower hole, the second element being pivotable in relation to an axis of alignment of upper holes of the first and second elements, and aligning, when not connected by its lower hole, in relation to a vertical axis of the first element; and
   a shackle having a pin that traverses the axis defined by the alignment of the upper holes of the first and second elements.

2. The device in accordance with claim 1, wherein the first and second elements are adjacent.

3. The device in accordance with claim 2, wherein at least one of the first and second elements is a solid object.

4. The device, in accordance with claim 3, wherein:
   the first element is a hollow object;
   the second element is shorter than the first element, and
   the second element is positioned on the inside of the first element pivoting between an internal and external part of the first element.

5. The device, in accordance with claim 4, wherein the second element is a solid object.

6. The device in accordance with claim 1, wherein:
   the first element is a hollow object;
   the second element is shorter than the first element, and
   the second element is positioned on the inside of the first element pivoting between an internal and external part of the first element.

7. The device in accordance with claim 6, wherein the second element is a solid object.

8. The device in accordance with claim 7, additionally comprising at least one spacer positioned on at least one contact surface of the first and second elements.

9. The device in accordance with claim 8, additionally comprising bushings on the interior of the holes of the first and second elements.

10. The device in accordance with claim 9, wherein the first and second elements are adjacent.

11. The device, in accordance with claim 1, additionally comprising at least one spacer positioned on at least one contact surface of the first and second elements.

12. The device in accordance with claim 1, additionally comprising bushings on the interior of the holes of the first and second elements.

* * * * *